April 5, 1949.
T. E. McFALL
2,466,253
PISTON RING
Filed July 14, 1947
2 Sheets-Sheet 1
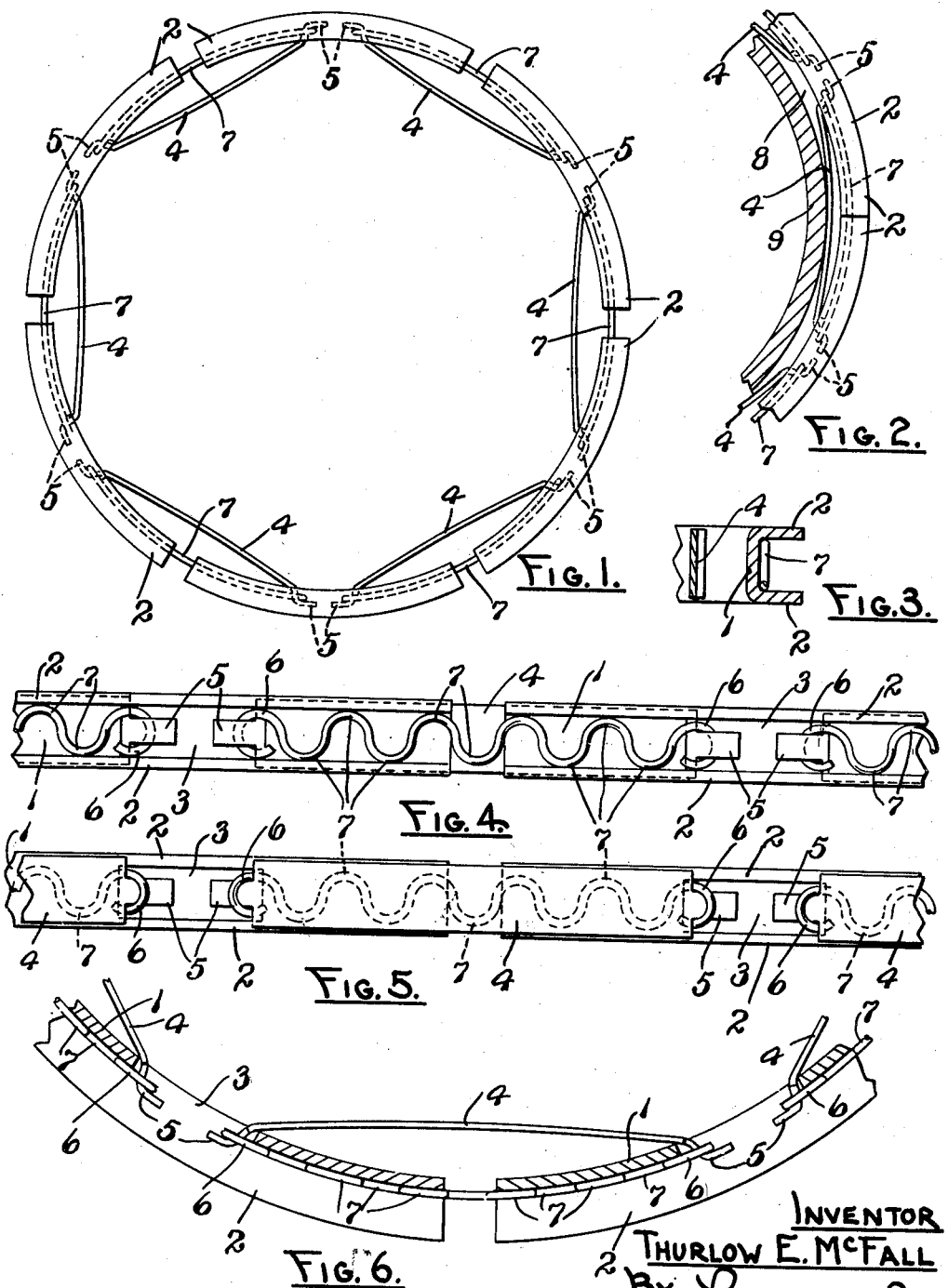
INVENTOR
THURLOW E. MCFALL
BY
ATTORNEYS April 5, 1949.  T. E. McFALL  2,466,253
PISTON RING
Filed July 14, 1947  2 Sheets-Sheet 2
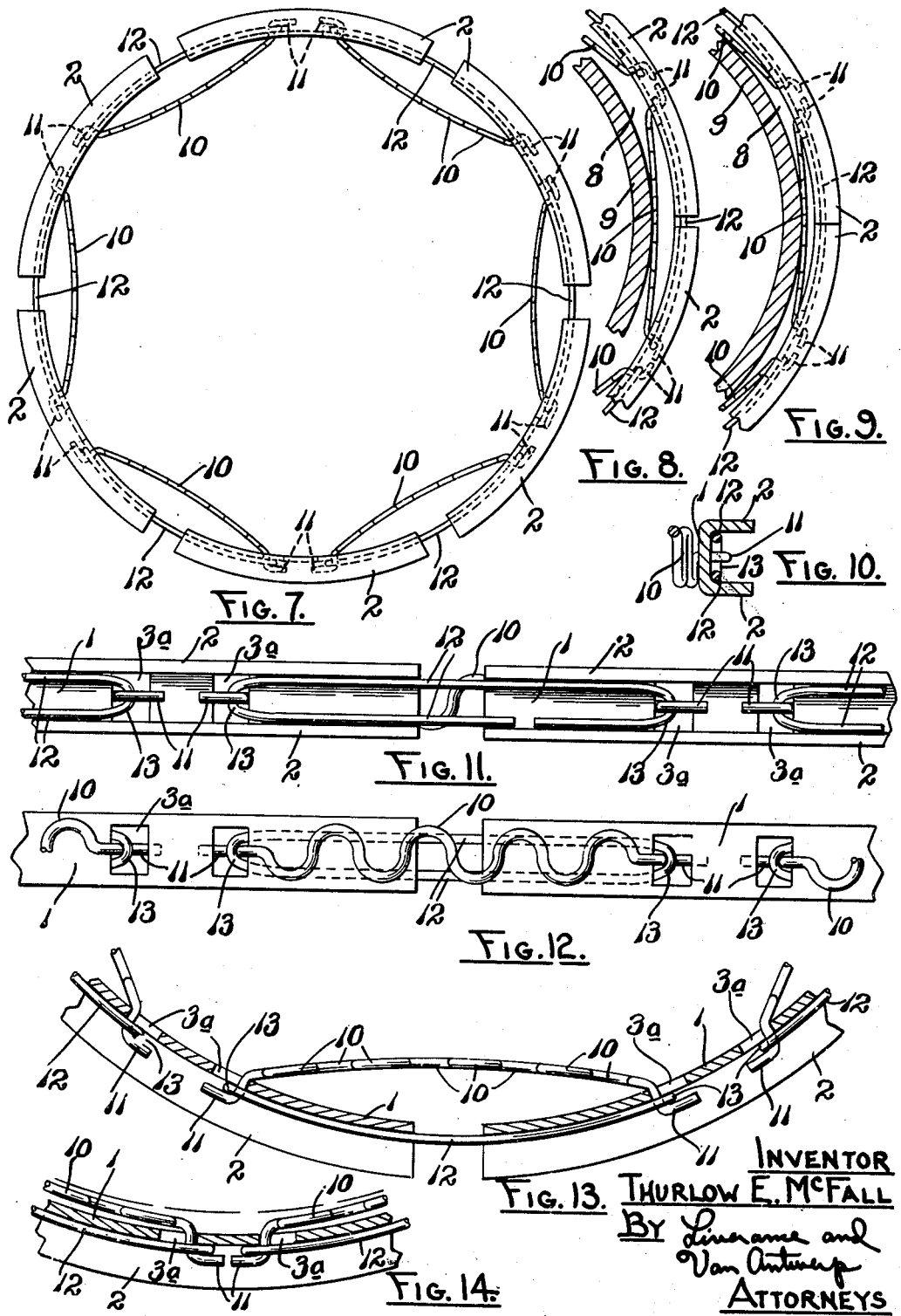
INVENTOR
THURLOW E. McFALL
BY Linerame and
Van Antwerp
ATTORNEYS Patented Apr. 5, 1949

2,466,253

UNITED STATES PATENT OFFICE 2,466,253

PISTON RING

Thurlow E. McFall, Sparta, Mich., assignor to Muskegon Piston Ring Company, Muskegon, Mich., a corporation of Michigan Application July 14, 1947, Serial No. 760,743

9 Claims. (Cl. 309—45)

This invention relates to piston rings which are, in general, used in the lower groove or grooves of an internal combustion engine piston to remove excess lubricating oil and return it to the engine crankcase. The upper "compression" rings in an engine cylinder, subjected to higher temperatures than the lower wire rings, are almost universally of cast iron. Vented oil rings of cast iron have also been used. In the present invention steel, or other suitable sheet metal which may be readily shaped, pressed and formed, is used to obtain an oil ring of as little weight as possible, whereby the inertia forces produced by the rapid reciprocation of pistons and the rings thereon is reduced, and economy in manufacture obtained. Furthermore, with my invention, the pressure with which all rings must bear against a cylinder wall to be effective, is obtained independently of the wall bearing parts of the ring. This permits the use of any required gauge of metal for the wall bearing elements of the ring, and an independent use of any desired or required strength of spring members which supply the forces of pressure, thereby permitting an easy attainment of the necessary area of cylinder wall contact of the ring for best service, and any necessary strength of force producing spring members for best unit pressures of the rings against cylinder walls.

An understanding of my invention, for attaining these objects and results, may be had from the following description, taken in connection with the accompanying drawings, in which Fig. 1 is a plan view of a piston ring made in accordance with my invention in its free, uncontracted condition, Fig. 2 is a fragmentary plan view and partial section illustrating the ring as it is used in service, in the groove of a piston, in contracted condition, Fig. 3 is a somewhat enlarged transverse vertical section through the piston ring at a side thereof, Fig. 4 is a fragmentary, enlarged outside elevation of the ring structure, showing the manner in which the plurality of sections thereof are assembled and connected together, Fig. 5 is a similar inner elevation, Fig. 6 is a fragmentary horizontal longitudinal section between the upper and lower sides of the ring, Fig. 7 is a plan similar to Fig. 1 of a modified form of ring structure, Figs. 8 and 9 are fragmentary plans and sections, similar to Fig. 2, showing the ring of my invention assembled with a piston at the ring groove therein at different stages of contraction of the ring, Fig. 10 is an enlarged transverse vertical section through a side of the ring, Figs. 11 and 12 are views similar to Figs. 4 and 5, respectively, that is, a fragmentary outside and a fragmentary inside elevation of the ring shown in Fig. 7, Fig. 13 is a fragmentary longitudinal horizontal section through the ring at two successive sections therein, with the sections separated at their adjacent ends, and Fig. 14 is a fragmentary similar section at an intermediate portion of a ring section, showing the position of the parts when the ring is contracted, as in service.

Like reference characters refer to like parts in the different figures of the drawings.

Referring to Figures 1 to 6, inclusive, the ring sections preferably are of channel form made of sheet metal, having vertical webs 1 and spaced outwardly extending horizontal flanges 2. The sections are of an arcuate shape so that when the required number are located end to end and with the ends in substantial contact, a circular ring is provided, the outer edges of the flanges 2 providing bearing surfaces to bear against a cylinder wall. The web 1 of each of the ring segments, substantially midway between its ends, is removed, leaving a somewhat elongated rectangular opening 3 between the flanges.

Between each two successive ring sections and bridging the gap or space between them, a flat elongated spring member or bar 4 is located at the inner side of the ring. At each end the spring bar 4 is reduced in width and bent outwardly for a short distance and thence again bent at an angle slightly greater than a right angle, providing tongues 5. Said reduced tongue portions pass through the openings 3. The width of the spring bar 4 is wider than the width of an opening 3, as shown in dotted lines in Fig. 4, so that at the juncture of the bars 4 with their tongues 5, stops are provided for the ends of the bars 4 to bear against the inner edges of the spaced flanges 2, one above and the other below each opening 3.

An extensible spring, preferably formed from a single length of spring wire rod, at each end is shaped into an eye 6 and between its ends formed into an alternate series of U-shaped loops or corrugations 7. The depth of the loops is such that the spring member is received between the flanges 2 at the outer side of the webs 1. It crosses the space or parting between the adjacent ends of the ring sections with which associated.

In applying the last mentioned spring member to the tongues 5, it is stretched for elongation and then connected with the tongues. The pull thereon tends to force the tongues toward each other and thereupon inwardly bows the spring bars 4. While the last mentioned spring member is preferably of a wire rod, the cross section of the rod is not necessarily restricted to any particular form, but may take any available cross section which can be used.

In the structure described, the length of the slots 3 is sufficient that the ring sections may be brought together substantially at their adjacent ends as they will be when contracted within an engine cylinder (Fig. 2), whereupon the free ends of adjacent tongues 5 more closely approach each other than when the segments are separated at adjacent ends, as in Fig. 1. The piston ring is adapted to be located in the ring groove 8 of a piston 9, fragmentarily shown in Fig. 1, and upon circumferential contraction of the ring, the middle portions of the spring bars 4 press against the bottom of the ring groove and are bowed outwardly (Fig. 2). When the several sections of the ring and the connecting members have been assembled as described, there is no danger of accidental or other separation of the parts, as the tension in the strained loops 7, on stretching the outer spring members, insures against disconnection from the tongues 5. The outward pressure at the free edges of the flanges 2 against a cylinder wall is apparent when the ring is circumferentially decreased in length and with the spring bars 4 bearing against the bottom of the ring groove, thus obtaining a desired pressure of the bearing surfaces against the cylinder wall. The openings 3 also serve as oil passing openings or vents for passage of oil collected in the channel grooves of the sections to go into the piston ring groove and thence be drained through the wall of the piston in a well known manner.

In the structure shown in Figs. 7 to 14, inclusive, two shorter length spaced openings 3a are made in the webs 1 of the ring sections in place of one somewhat elongated single opening 3. The inner spring member 10 is formed preferably from a length of spring wire rod corrugated to provide alternate U-shaped loops, and at each end thereof the wire terminates in a finger 11, adapted to pass through an opening 3a. With the two oppositely extending fingers 11 of an inner spring member, an elongated wire connecting link is used, formed into a long link having parallel sides 12 spaced from each other and joined integrally at their ends by U-bends 13. The distance between the sides 12 is slightly less than the distance between the upper and lower flanges 2 of the ring sections. The members 10 and 12, in general, take the places of the members 4 and 7 of the first described structure. The length of the connecting links having the sides 12 is such that when engaged with the fingers 11, as in Fig. 1, the inner spring members 10 are bowed inwardly, as in Fig. 7.

When the circumferential length of the ring is contracted to close the spaces between adjacent ends of the sections which the ring has in its free unrestrained condition in Fig. 7, the relative movement of the ring sections with respect to the inner bowed springs 10 brings the outwardly bent portion of the fingers 11 against the ends of the intermediate portion of the web 1 between the openings 3a, providing abutments for the inner spring member 10. In this structure the outward pressure of the ring against a cylinder wall is obtained largely, if not entirely, from the inner corrugated springs 10, and such pressure is not released or dissipated when the springs 10, upon contacting the bottom of the ring groove, are thereafter bowed outwardly. The abutment engagement described should occur substantially as the spring 10 comes against the bottom of the ring groove, as shown in Fig. 8.

With the forms of the invention shown, a very economical, easily fabricated spring and connecting members between the ring sections is provided, in one form made wholly from spring wire and in the other partly therefrom. The assembly is quickly done. The bearing area of the flanges 2 may be increased or decreased by using different thicknesses or gauges of sheet metal for the ring sections, and the strength of the corrugated springs 7 and 10, or of the spring bars 4, may be altered by selecting different dimensions of spring wires or bars used.

The invention is defined in the appended claims and is to be considered comprehensive of all forms of structure coming within their scope.

I claim:

1. A piston ring comprising, a plurality of sections of curved form located successively in end to end alinement to make a circular ring when adjacent ends of sections are substantially together, a pair of outer and inner members extending from each of the sections to the next adjacent section, one of said members at each end thereof passing through each of the ring sections with which associated, and the other having detachable connection at its ends therewith, and one of said members being of spring material and longitudinally expansible and contractible.

2. A structure as defined in claim 1, said expansible and contractible member having corrugations therein located substantially vertical and alternately open at upper and lower sides.

3. A piston ring comprising, a plurality of curved sections, each having a channel groove at its outer side and each having an opening between its ends from its inner side to the bottom of the groove, said sections being located in end to end relation and providing a circular ring when the ends of the sections are substantially together, a plurality of inner members each extending from an opening in one section to the opening of a next adjacent section, each end of each of said inner members passing through its adjacent opening and terminating in a free end portion providing a hook, and a second member in the groove of each of two adjacent sections extending across the gap between them and detachably connected at its ends to said hooks, one of said members being of spring material and longitudinally expansible and contractible, the inner members being adapted to bear against the bottom of a piston ring groove in which the ring is located and bowing outwardly upon contraction of the ring within a cylinder to bring successive ring sections in close proximity at adjacent ends.

4. A structure as defined in claim 3, said outer member, located in the groove of two adjacent ring sections, at each end having an open loop through which the hooks at the ends of its associated inner member freely pass to provide said detachable connection of inner and outer associated members.

5. In a piston ring, a plurality of ring sections of curved form and of channel cross section, each longitudinally grooved at its outer side and each having an opening located between the ends of each section from the inner side of each section to the bottom of its groove, an inner spring member of flat metal extending from an opening in each of said sections to an opening in the next adjacent section, each of said inner members at each end having an end portion passing through its adjacent opening and terminating in a free end section substantially paralleling the bottom of the groove, and an outer spring member located in said groove of the adjacent end portions of each of two successive ring sections, provided with alternate vertically positioned U-shaped loops in the length thereof and at each end having an eye connecting with its associated end of the inner spring member.

6. In a piston ring, a plurality of curved ring sections of channel form, each having a longitudinal groove from one end to the other thereof at its outer side, and each having two spaced openings between its ends from the inner side of a section to the bottom of the groove therein, a longitudinally expansible and contractible spring member at the inner sides of the adjacent end portions of successive sections, formed at each end with a hook member extending through the openings nearest the adjacent ends of said ring sections, and a tie member having openings at its ends detachably connected at opposite ends with the ends of said inner spring member.

7. A ring structure as defined in claim 6, each of said tie members comprising, a length of wire having upper and lower substantially parallel sides and integral U-bends connecting the ends of said sides.

8. A piston ring comprising, a plurality of curved ring sections of channel form each longitudinally grooved at its outer side, each of said sections having an opening between its ends from its inner side to the bottom of its groove, said opening being located between the ends of each section, an inner elongated spring member extending from the opening of each of said sections to the opening of the next adjacent section, said spring member at each end passing through its adjacent opening, an elongated tying member extending from one end of each of said spring members to the opposite end thereof and located in the grooves of the successive ring sections with which the inner spring member is associated, and detachable connections between the ends of the inner spring member and the outer member.

9. A structure a defined in claim 8, said inner spring member being of flat spring material and the outer member comprising a length of spring material corrugated with alternate vertical loops.

THURLOW E. McFALL.

No references cited.